March 3, 1970 D. R. OLDHAM ET AL 3,497,895
VEHICLE CLEANING BRUSH SHIFTABLE FOR ANTENNA CLEARANCE
Filed Feb. 6, 1968 6 Sheets-Sheet 1

INVENTORS
DALE R. OLDHAM
JOHN K. BUNCH
BY Woodard, Weikart,
Emhardt & Naughton
ATTORNEYS

INVENTORS
DALE R. OLDHAM
JOHN K. BUNCH
BY Woodard, Weikart,
Emhardt & Naughton
ATTORNEYS

FIG. 11

INVENTORS
DALE R. OLDHAM
JOHN K. BUNCH
BY Woodard, Weikert
Emhardt & Naughton
ATTORNEYS United States Patent Office 3,497,895
Patented Mar. 3, 1970

3,497,895
VEHICLE CLEANING BRUSH SHIFTABLE
FOR ANTENNA CLEARANCE
Dale R. Oldham and John K. Bunch, Phoenix, Ariz., assignors to Earl Dallas Smith, Phoenix, Ariz.
Filed Feb. 6, 1968, Ser. No. 703,404
Int. Cl. B60s 3/06
U.S. Cl. 15—21                                              13 Claims

ABSTRACT OF THE DISCLOSURE

A vehicle top cleaning brush axially shiftable on signal from a sensor engageable by the vehicle antenna for clearance thereof by the brush which continues to operate during passage of the antenna thereby. An additional sensor to return the brush after passage thereof by the antenna. Duplicate sensors on both sides of center of the vehicle path for appropriate brush control regardless of which side the antenna is located. Combination balance and lift cylinder for control of brush load against the vehicle and brush lifting by remote manual control.

BACKGROUND OF THE INVENTION

Field of the Invention

This invention relates generally to vehicle cleaning apparatus and more particularly to apparatus wherein a vehicle-engaging cleaning member is automatically movable to avoid encounter with vehicle appendages which are to be avoided, and automatically returned to normal position after avoidance.

Description of the prior art

It is well known by manufacturers and users of vehicle washing apparatus, that problems are presented by certain appendages projecting from vehicle bodies. Perhaps the most troublesome is the radio antenna. Apparatus incorporating side and window cleaning brushes or "overhead" brushes for cleaning vehicle top surfaces, can quickly remove antennas unless special care or automatic controls are provided. It is desirable to minimize the attention needed from the operator, so automatic controls have been provided in some instances.

Where automatic controls have been provided, in some cases they have been used to stop operation of side and window cleaning brushes. They have also been used to lift an overhead brush completely from the surface of the vehicle. An example of the latter technique is found in U.S. Patent No. 3,251,084 issued May 17, 1966 to Larson et al. In either event, cleaning of the vehicle by the brush terminates for a period of time, resulting in the necessity for subsequent hand finishing in the areas missed by the brushes while they were retained inactive for antenna clearance.

The present invention overcomes the prior art problems because, although it provides automatic control and avoidance of antennas, it achieves maximum utilization of the cleaning brush.

SUMMARY

Described briefly, in a typical embodiment of the present invention, the overhead brush is mounted on a carriage such that the brush cannot only move up and down, but can also be shifted transverse to the direction of a vehicle moving thereunder. Sensor wands are provided between the brush and the approaching vehicle and positioned to encounter any antennas located thereon.

Upon encounter of either wand, the overhead brush is shifted in the appropriate direction and shifting continues until the antenna clears the wand, whereupon it will also clear the brush.

Additional sensors are provided adjacent the opposite ends of the brush to initiate return thereof after contact by the antenna passing by the brush. The brush weight, and its load on the vehicle, is balanced by fluid pressure in a cylinder which is also useful to lift the brush in response to remote control whenever desired.

BRIEF DESCRIPTION OF THE DRAWING

The full nature of the invention will be understood from the accompanying drawings and the following description and claims.

DESCRIPTION OF THE PREFERRED EMBODIMENT

Referring now to the drawings in detail, a floor-mounted arch structure 11 is provided, with an overhead bridge portion 12 at a suitable elevation for passage of a vehicle thereunder. Where the apparatus is intended for use with motor cars only, the height of the lower margins of this bridge structure may conveniently be of the order of five or six feet above the floor 13. A conveyor 13 is provided at the floor and includes a plurality of rollers 16 spaced therealong to move the car through the archway by engagement with the left-front tire. In the drawing, a full sized car 17 is being moved along a path toward the archway by the conveyor 14.

An "overhead" brush 18 is suspended from the bridge 12, and extends across the path of the car. The brush is mounted for rotation on axis 19 normally located between two and three feet above the floor as the car approaches. The brush typically has conventional flexible plastic bristles which extend when rotated as shown, to provide a brush approximately three feet in diameter. Rotation can be effected by a variety of means, but in the illustrated example it is accomplished by a hydraulic motor mounted within the brush hub and affixed to the arm 21 of the brush holder 22.

According to one feature of the invention, brush 18 is not only rotatable by the drive motor but also is axially shiftable. For this purpose, a carriage 23 (FIGS. 2 and 3) is provided in the illustrated embodiment, being mounted on the bridge 12 by means of upper and lower wheels 24 and 26, respectively. Wheels 24 roll on the top flange 27 of the rear rail 28 of bridge 12, and wheels 26 roll on the angle section track 29 (FIG. 3) secured to the underside of the top flange 31 of the front rail 32 of bridge 12.

Figure 3:
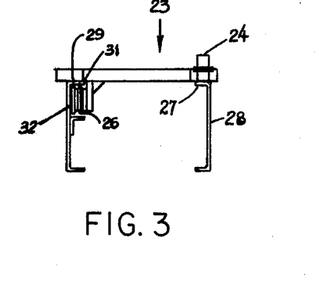
FIG. 3 is a cross section at line 3—3 in FIG. 2 and illustrating carriage roller mounting.
Figure 4:
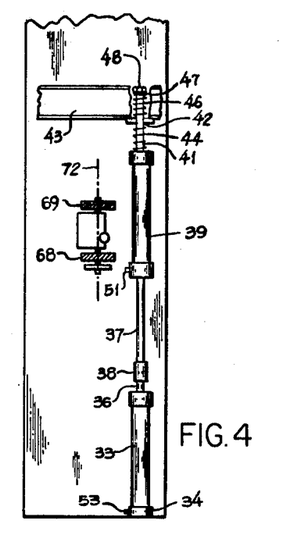
FIG. 4 is a fragmentary plan view showing the carriage shift cylinders and their mounting to the archway and carriage, and showing one of the sensor mountings.

Centering of the carriage on the bridge so that brush 18 is in the center of the path of the car, is accomplished by apparatus including two motors in the form of hydraulic cylinder and piston assemblies (FIG. 4). The end of cylinder 33 is affixed at 34 to the end of the bridge. The piston rod 36 thereof is normally retracted therein and is connected to the end of the piston rod 37 of the other cylinder by a coupling 38. Rod 37 is normally extended from cylinder 39, the latter having a bar 41 affixed to the other end and extending through an aperture in a plate 42 projecting downwardly from a cross member 43 of the carriage 23. Two centering springs 44 and 46 are provided on opposite sides of the plate, 44 abutting the end of the cylinder assembly and 46 abutting a washer 47 secured to the end of the bar 41 by a nut 48 threadedly received thereon. To move the brush to the right (arrow 49, FIG. 1) hydraulic fluid is supplied to cylinder 39 at port 51, retracting the rod 37 and thus pulling cylinder 39 and the carriage to the right. To move the carriage to the left (arrow 52, FIG. 1), hydraulic fluid is supplied to port 53 of cylinder 33, extending the piston rod 36 thereof and thus moving rod 37, cylinder 39, and the carriage to the left. The sensors and controls for accomplishing this shifting movement, will now be described.

Figure 1:
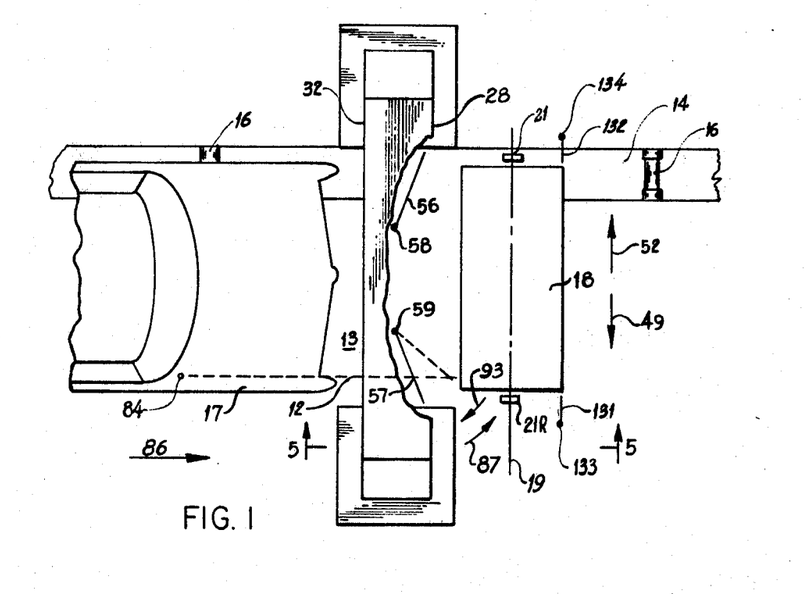
FIG. 1 is a somewhat schematic top plan view of the apparatus with a car approaching.
Figure 6:
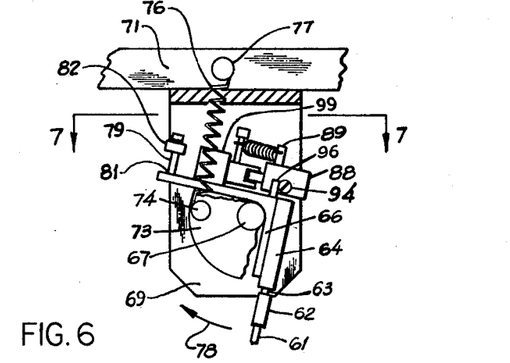
FIG. 6 is a further enlarged fragmentary elevational view of the sensor mounting assembly.

As shown schematically in FIGURE 1, two wands 56 and 57 project outwardly from pivot points 58 and 59 respectively. Because of their similarity in construction and function, a description of one will suffice. Wand 57 has its inner end affixed to a downwardly extending hanger 61. This hanger is a light weight tube extending upward to a coupling 62 connected to the lower end of a shaft 63 (FIG. 6) extending upward through a bearing tube assembly 64 affixed to a plate 66 of L-shaped cross section which is affixed to a horizontal shaft 67 pivotally mounted in the depending legs 68, 69 of a bracket affixed to the carriage cross member 71. The whole assembly is thereby capable of pivoting on the horizontal axis 72 of shaft 67 (FIG. 4). A disk 73 is affixed to shaft 67 and has a pin 74 received therein. Return spring 76 has its lower end connected to this pin and its upper end may be connected to a pin 77 in the carriage cross member so that the spring constantly urges the assembly in the clockwise direction of arrow 78, with the plate 66 engaging a stop screw 79 at its lower end 81, the stop screw being threadedly received in a member 82 affixed to bracket 69 to provide an adjustable stop.

Figure 7:
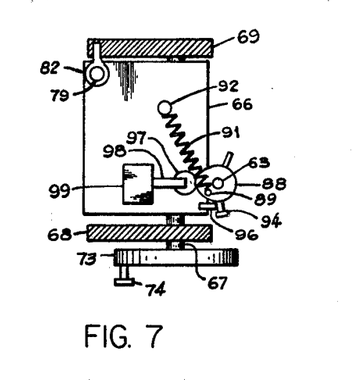
FIG. 7 is a section taken at line 7—7 in FIG. 6 and viewed in the direction of the arrows.

Referring again to FIGURE 1, the car 17 has an antenna 84 mounted atop the right front fender near the windshield. According to the illustrated embodiment of this invention, it is desirable that as the car is moved forward in direction of the arrow 86 by the conveyor 14, this antenna is to engage wand 57 and turn it in the counter-clockwise direction of arrow 87. For this reason, the shaft 63 (FIGS. 6 and 7) to which the upper end of hanger 61 is secured through coupling 62, is rotatable in the bearing tube 64 on the shaft axis. A cam 88 is normally affixed to the shaft 63 near its upper end and has a post 89 offset from the shaft axis and projecting upwardly therefrom. A spring 91 is connected between post 89 and post 92 affixed to the plate 66 and projecting upwardly from the top portion thereof. This return spring normally urges the shaft 63 and therefore the wand 57 in the direction of the arrow 93, stop means being provided in the form of a screw 94 in the cam 88 and an abutment 96 affixed to the plate 66. Therefore the wand is normally located in the position shown by the solid outline at 57 in FIGURE 1. At this time a cam follower roller 97 engages the surface of the cam, a roller being mounted to a plunger shaft 98 operable upon reciprocation thereof to actuate an air switch 99. For purposes of this example, it will be assumed that a spring in the switch 99 urges the plunger and roller outwardly against the cam surface so that as the wand is rotated by the antenna, the roller will be moved by the switch spring off the high point of the cam to change the switched condition of the switch 99.

Figure 8:
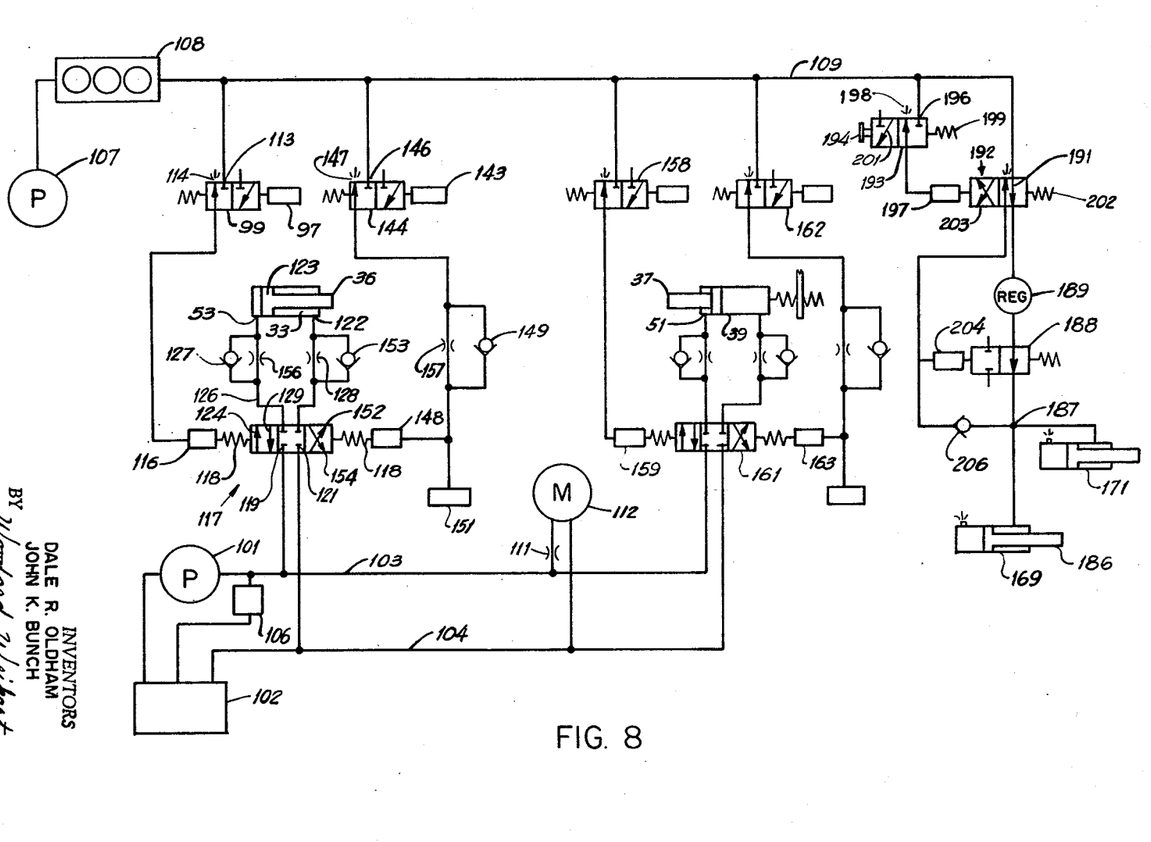
FIG. 8 is a schematic pneumatic-hydraulic diagram of control circuitry.

Referring now to the pneumatic-hydraulic schematic diagram of FIGURE 8, a hydraulic pump 101 taking hydraulic fluid from the sump 102 provides adequate pressure on line 103, and a return to sump is provided at line 104. A pressure relief valve is shown at 106.

An air supply is provided from compressor 107 through the usual filter, regulator, and lubricator shown schematically in block 108 to the line 109. Hydraulic fluid is supplied from line 103 through a pressure compensated flow control 111 to the overhead brush drive motor 112, the flow control being employed to establish constant rotational speed of the brush regardless of load thereon, the drive motor being a positive displacement type of motor.

Because the controls for shifting the brush to the left and returning it to center are virtually the same as those for shifting the brush to the right and returning it to center, description of one set will suffice. Moreover, it is believed that the description of the brush return controls will be more meaningful if the operation of shifting the brush to the left is described before the return controls are described.

BRUSH SHIFT TO THE LEFT

Referring again to FIGURE 1, as the car approaches, it is desirable to shift the brush and its holder to the left to avoid antenna 84. Therefore, when the antenna 84 first encounters the wand 57 it moves it slightly in the direction of the arrow 87. This causes the cam 88 to rotate slightly whereupon the plunger of air switch 99 is shifted. FIGURE 8 shows the switch in its normal position whereupon the switch valve blocks the supply at 113 and vents at 114 the pilot 116 of the three-position, closed-center, spring-centered directional valve 117. This valve is normally centered by the springs 118 whereupon it blocks the hydraulic pressure supply thereto at 119 and blocks the return at 121. Therefore no fluid flow can occur at either the port 53 or port 122 of the carriage shift cylinder 33 and the piston 123 is normally bottomed adjacent the left-hand end whereupon the piston rod 36 is retracted as discussed above with reference to FIGURE 4. Accordingly, so long as valve 117 remains centered, the piston will remain as shown.

Upon very slight rotation of shaft 63 in response to contact of the wand 57 by antenna 84, the cam action will result in shifting of the air switch valve to the left (FIG. 8) whereupon the air supply from line 109 will be applied to the valve pilot 116 shifting it to the right. Hydraulic fluid is immediately applied through valve passage 124 line 126, check valve 127 and port 53 to the left-hand side of piston 123. This pushes the piston toward the other end of the cylinder moving the carriage and brush in the direction of arrow 52 in FIGURE 1. The speed of movement is controlled by bleeding hydraulic fluid through orifice 128 from the right-hand side of the piston back to sump through the passageway 129 in directional valve 117. The orifice should be sized so that the carriage shifting is fast enough compared to the speed of the car as determined by the conveyor, for the wand to again move away from the antenna and permit shifting of the air switch back to its original condition shown in FIGURE 8. In this way, shifting of the brush in short increments continues until the carriage has moved far enough to the left that the antenna can no longer engage the wand. If the wand 57 extends out as far from the center of the path of the car as the outer edge of the brush support arm 21R, there is assurance that the carriage is shifted far enough to the left of the path that the antenna will not contact any portion of the brush or its support arm. Yet, by judicious selection of the orifice 128 with reference to carriage shift speed capability and conveyor speed, overshifting of the brush can be avoided.

BRUSH RETURN TO CENTER

Referring again to FIGURE 1, wands 131 and 132 are shown projecting inwardly from points 133 and 134 respectively. These are the brush return wands, wand 131 being useful to cause return of the brush in direction of the arrow 49 from a left-hand shifted position, and wand 132 being useful to shift the brush to the left in the direction of arrow 52 back to center from a right-hand shifted position. Description of the apparatus associated with wand 131, and the function thereof, will suffice for both.

Figure 5:
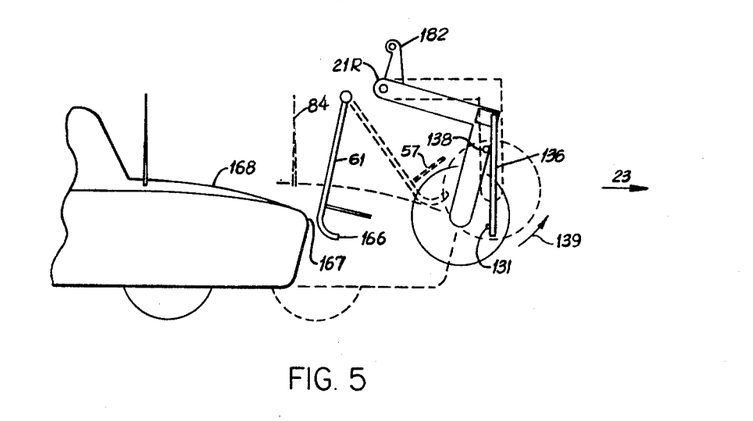
FIG. 5 is a fragmentary section at line 5—5 in FIG. 1 and showing the brush in the lowermost position, and unactivated sensors, in solid outlines.
Figure 10:
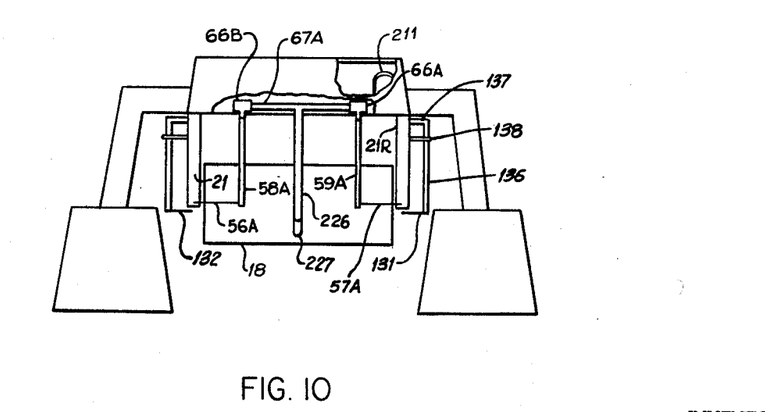
FIG. 10 is an elevational view looking through the archway toward the brush, showing some alternatives.

Referring to FIGURES 5 and 10, a hanger 136 is pivotally mounted to the brush arm 21R at horizontal shaft 137, and is horizontally spaced about six inches from the outer face of the arm, allowing adequate space for passage of the antenna 84 between the arm and the hanger. A stop post 138 also projects out from the arm 21R parallel to the shaft 137 and above the top of any antenna which would be bypassing the arm and hanger 136, particularly when the brush is working on the hood or deck lid of a car. The wand 131 is affixed to the hanger 136 near the lower end thereof for engagement by the antenna as it passes, to swing the hanger in the direction of the arrow 139 about the axis of shaft 137.

Figure 9:
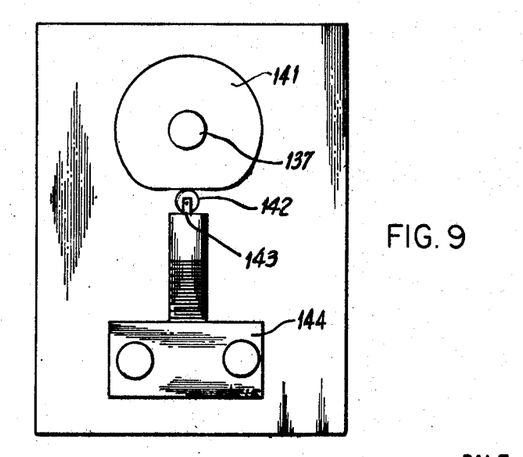
FIG. 9 is an elevational view of a return sensor cam and switch.

Inside the tubular structure of the arm 21, and mounted to a plate covering an opening in the arm, best shown apart from the arm as in FIGURE 9, there is a cam 141 affixed to the shaft 137 and having a cam follower roller 142 engaged therewith. This roller is on the end of a plunger 143 of air switch 144. As shown in FIGURE 8, switch 144 is normally in position blocking the air supply at 146 and venting the valve pilot 148 at 147.

When the antenna 84 engages wand 131, a slight pivoting of the hanger 136 and thereby shaft 137 will be caused resulting in cam actuation shifting the air switch 144 to supply air from line 109 through the switch and check valve 149 to the accumulator 151. As the pressure rises in the accumulator, complete clearance of the brush by the antenna is effected as the conveyor continues to move the car. When the pressure rise in the accumulator is sufficient to actuate the pilot 148 against the spring load 118 and shift the valve to its third position, hydraulic pressure is supplied through the valve passageway 152 and check valve 153 to the rod-side of the piston 123, initiating its return to the initial position shown in FIGURE 8. The speed of return will be controlled by orifice 156 as fluid flows from port 53 therethrough and through valve passageway 154 and the return line 104 to sump.

When the antenna has passed the wand 131, and the hanger 136 has returned to the stop 138, the air switch valve 144 can again return to its initial position to vent the pilot 148 and allow shift valve 117 to return to center position. The provision of the orifice 157 in parallel with check valve 149 will maintain pressure in the pilot 148 after the air switch 144 has returned to initial condition, long enough to allow the carriage to return to center position even though the antenna has terminated contact with the return wand 131.

The sensing of the right-hand mounted antenna by wand 57 and shifting of the brush to the left for clearance of the antenna, as well as return of the brush to center in response to antenna sensing by return wand 131, has now been described. The action of the left-hand mounted wand 56 is the same. Again referring to FIGURE 8, the air switch 158 is actuated by turning of the wand 56 by a left-hand mounted antenna. This causes pilot 159 to shift the valve 161 from center. This applies hydraulic pressure through the valve 161 to the port 51 of the shift cylinder 39 (FIG. 4) to pull the carriage toward the right. Activation of return wand 132 by the antenna operates the air switch 162 applying pressure to the pilot 163 shifting the valve 161 to its third position whereupon pressure is applied to the right-hand end of the piston in cylinder 39 and the rod-end is returned to sump through valve 161 causing the rod 37 to again extend and push the carriage back to center.

In the foregoing description it was mentioned that the shaft 67 (FIGS. 6 and 7) is rotatable on a horizontal axis. FIGURE 5 best illustrates the reason for this in that it permits the lower end portion 166 of the tube 61 to be pushed forward by the front end 167 of the car. The forward curved portion 166 has a non-marring plastic sleeve thereon so this portion of the hanger tube can slide along the top of the hood as the car moves forward. However, the antenna can continue to activate the wand so long as the brush has not been shifted far enough to the left to clear the antenna.

It can also be noted in FIGURE 5 by the dotted outlines that as the front end and hood of the car lift the overhead brush, the stop 138 prevents any change in the relationship between the arm 21R and the return wand hanger 136 until such time as the antenna encounters the wand 131 thereon.

OVERHEAD BRUSH BALANCING AND LIFTING

Figure 2:
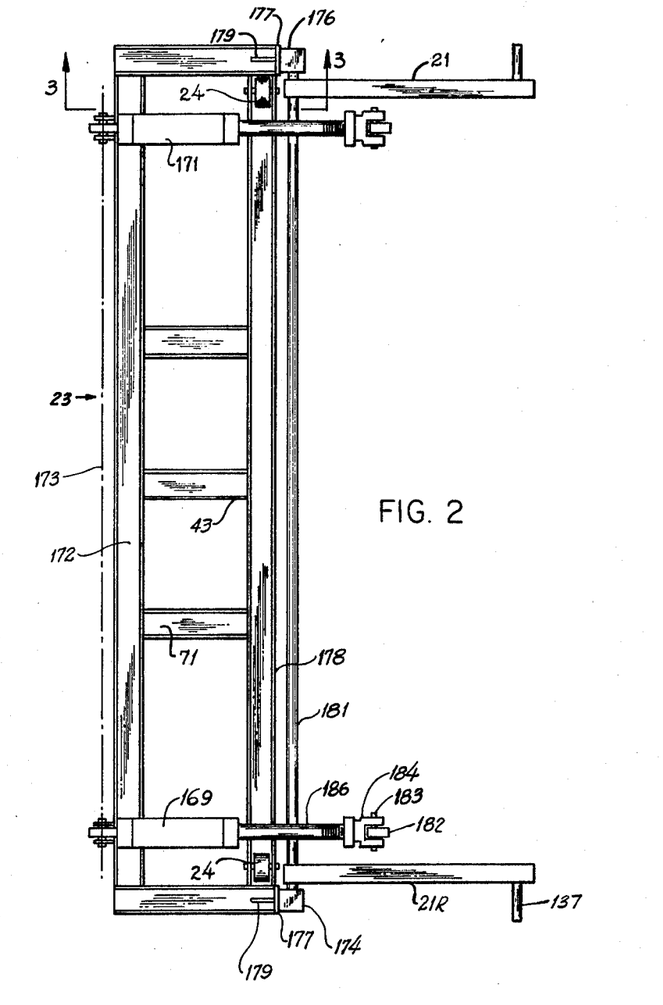
FIG. 2 is an enlarged plan view showing the carriage and brush holder mounting thereto.

Referring to FIGURES 2 and 5, the plan view of the illustrated carriage shows a frame of channel sections welded together. Two pneumatic cylinders 169 and 171 are provided with one end of each pivotally mounted to suitable brackets on the front rail 172 of the carriage for pivoting on a horizontal axis 173. Pillow blocks 174 and 176 are affixed to the carriage by fastening to plates 177 welded to the rear rail 178 of the carriage and buttressed by plates 179. A cross shaft 181 is pivotally mounted in these pillow blocks and the brush holder arms 21 and 21R are affixed to shaft 181.

Two crank arms 182 are also affixed to the shaft 181 and each is connected by a pin 183 to the yoke 184 affixed to the end of the piston rod of one of the two cylinders. The crank arm nearest brush arm 21R is connected to the piston rod 186 of the pneumatic cylinder 169.

Referring again to FIGURE 8, the two pneumatic cylinders are shown with a common air supply from the junction 187. Air is normally applied at this point through a valve 188 which receives air at a pressure established by the regulator 189 supplied through paassageway 191 of the valve 192 supplied from the system air line 109. The pressure output from regulator 189 is adjusted to provide the amount of pressure desired on the rod-end of the two pneumatic cylinders to provide the amount of "crush" of the overhead brush desired for adequate cleaning of the vehicle without excessive loading of either the vehicle or the brush. It is a feature of this invention that the brush and holder weight are thus balanced by the pneumatic cylinders, which can also be used to lift the brush entirely clear of the car.

For this latter purpose, a push button switch 193 is provided with a push button 194. The supply to this air switch is normally blocked at 196 and the pilot 197 of valve 192 is vented through the switch 193 at 198. When the button is pushed to lift the brush, the valve in the switch 193 is moved against the bias of its return spring 199 to connect the supply 109 through passageway 201 to the air pilot 197 shifting the valve 192 against its return spring 202. Valve 192 then supplies line pressure through passageway 203 thereof to the air pilot 204 of the switch 188 whereby the valve is shifted and both the inlet and outlet lines therefrom are blocked. Line pressure is also supplied through the check valve 206 to the junction 187 and from there to the rod-ends of both pneumatic cylinders, thus retracting the piston rods thereof and lifting the brush.

When the push button 194 is released, the spring 199 returns it to normal, whereupon the valve pilot 197 is vented and pilot 204 is vented. Check valve 206 prevents backflow from the cylinders therethrough and they are then vented through valve 188 and the regulator 189 until the desired balancing pressure is re-established in the rod-ends of the cylinders. In the illustrated example, the ends of the cylinders opposite the piston rods are vented. Suitable controls can be provided at these ports to provide control of lift and descent speed if desired.

Figure 11:
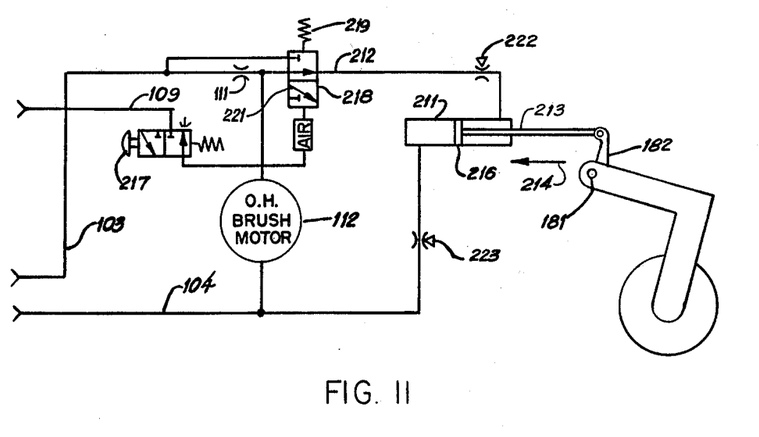
FIG. 11 is a diagram of a portion of the circuitry of FIG. 8 as modified for brush balancing by hydraulic instead of pneumatic means.

In another and preferred embodiment of the invention, a single hydraulic balance and lift cylinder 211 (FIG. 10) is provided in exactly the same location with the same pivotal connections at axis 173 and pin 183 as for the pneumatic cylinder 169 in FIGURE 2. Cylinder 171 is omitted and the single cylinder 211 provides the balance and lifting functions for the overhead brush. As shown in FIGURE 11, wherein the lines 103 and 104 of FIGURE 8 are shown, as well as the overhead brush motor 112 and the pressure compensated flow control 111, a line 212 is connected from the motor supply side to the rod-end of hydraulic cylinder 211. Accordingly, the pressure of hydraulic fluid to the brush motor is also applied in the cylinder to urge the piston rod 213 in the direction of arrow 214. By suitable sizing of the piston and cylinder assembly, the torque applied to the shaft 181 by the cylinder and opposing the weight of the brush and arm assembly can be made precisely that which gives the desired crush of the overhead brush on the top of the car. As the load on the overhead brush increases in response to movement thereof up over the hood or up the windshield of the car, the pressure rises in line 212 because, as mentioned previously, the motor is a positive displacement type and valve 111 adjusts pressure to maintain a constant flow to the motor 112. The pressure rise in line 212 applied by control 111 to maintain a constant overhead brush motor speed tends to lift the brush. This results in a reduction of the brush load, reduction of pressure, and a reduction of the balancing force on the piston 216. If the brush load increases as a consequence, the force on the piston again increases. The result of this constant sensing of brush load and direct response to the balancing cylinder provides an excellent tracing action of the brush over the upper surface contours of the vehicle.

If it is desired to life the brush completely from the car, push button 217 can be pushed shifting the valve from the position shown against the urging of return spring 219 to its second position connecting supply line 103 through valve passageway 221 to the lift cylinder 211. Upon release of the button 217, the valve 218 again return to initial position, whereupon the pressure lift cylinder can return to the motor supply pressure. Speed of operation of the lift cylinder in either direction can be adjusted by the adjustable restriction 222 on the supply line thereto or by the restriction 223 on the sump return line.

FIGURE 10 also illustrates a variation in the control of the hangers for the antenna sensing wands. In this example, hanger 59A is exactly like hanger 61 of FIGURE 5, except that it omits the forwardly curved portion 166. Wand 57A is connected to hanger 59A at the lower end of the straight portion thereof just as wand 57 was connected to the hanger 61. Hanger 58A and wand 56A are provided in the same manner. Instead of the lower portions of these hangers being forwardly curved as shown in FIGURE 5, a center bar 226 extending downwardly in the same plane as hangers 58A and 59A and parallel thereto is disposed equidistant therebetween and has the curved portion 227 thereon just like curve 166 in FIGURE 5, and having a plastic sleeve thereon. The upper end of this bar is affixed to a shaft 67A extending to both of the wand hanger mounts 66A and 66B. Therefore, instead of each of the hangers following the surface of the vehicle directly as in the previously described embodiment, the center bar does it in this instance, and moves both of the hangers together, shaft 67A pivoting on axis 72 (FIG. 4) just as the individual hangers did in the previously described embodiment.

The invention claimed is:

1. In a vehicle cleaning apparatus, the combination comprising:
   mount means;
   a cleaning member supported on said mount means in a first position wherein said cleaning member is engageable with first and second portions of a vehicle to be cleaned;
   first sensor means disposed between said cleaning member and said vehicle second portion;
   first motor means coupled to said cleaning member;
   and control means coupled to said motor means and to said first sensor means and responsive to actuation of said sensor means by said vehicle second portion to cause said motor means to move said cleaning member away from said first position to avoid said vehicle second portion;
   second sensor means associated with said cleaning member and coupled to said control means,
   said control means being responsive to actuation of said second sensor means to cause said motor means to return said cleaning member to said first position.

2. The combination of claim 1 wherein said control means include time delay means for delaying initiation of return of said cleaning member in response to actuation of said second sensor.

3. In a vehicle cleaning apparatus, the combination comprising:
   mount means;
   a cleaning member supported on said mount means in a first position wherein said cleaning member is engageable with first and second portion of a vehicle to be cleaned;
   first sensor means disposed between said cleaning member and said vehicle second portion;
   first motor means coupled to said cleaning member;
   and control means coupled to said motor means and to said first sensor means and responsive to actuation of said sensor means by said vehicle second portion to cause said motor means to move said cleaning member away from said first position to avoid said vehicle second portion;
   said cleaning member extending across the path of the vehicle to be cleaned, said mount means including guide means for guiding movement of said cleaning member by said first motor means in a direction transverse to said path.

4. In a vehicle cleaning apparatus, the combination comprising:
   mount means;
   a cleaning member supported on said mount means in a first position wherein said cleaning member is engageable with first and second portions of a vehicle to be cleaned;
   first sensor means disposed between said cleaning member and said vehicle second portion;
   first motor means coupled to said cleaning member;
   and control means coupled to said motor means and to said first sensor means and responsive to actuation of said sensor means by said vehicle second portion to cause said motor means to move said cleaning member away from said first position to avoid said vehicle second portion;

said cleaning member extending across the path of the vehicle to be cleaned, and mounted for movement transversely of the path of the vehicle, and said first sensor means including:
> a hanger disposed in said path nearer than is said cleaning member to a vehicle approaching said cleaning member along said path;
> and a wand projecting laterally from said hanger toward the side of said path;
> said hanger being movable transversely with said cleaning member by said motor means, and movable upwardly by the vehicle for passage of the vehicle thereunder;
> said hanger being pivotable by engagement of said vehicle second portion with said wand thereon and thereby actuated for movement of said cleaning member from said first position.

5. The combination of claim 4 wherein said cleaning member is a horizontally extending rotary brush, and said mount means include stationary overhead structure having guide means thereon extending in a direction transverse to said path, the combination further comprising:
> a carriage mounted on said structure and connected to said first motor means for movement thereby along said guide means;
> a brush holder pivotally mounted to said carriage, said brush being mounted to said holder for rotation thereon about a horizontal axis, said brush being liftable by pivoting said holder upward on said carriage;
> said hanger being mounted to said carriage and thereby movable transversely along with said brush by said motor means.

6. The combination of claim 5 and further comprising:
a first bracket affixed to said carriage;
> a second bracket mounted to said first bracket pivotally to accommodate said upward movement of said hanger by the vehicle;
> said hanger being pivotally mounted to said second bracket for rotation with respect thereto by said engagement of said vehicle second portion with said wand;
> a cam connected to said hanger and rotatable therewith;
> a switch connected to said second bracket and operable by said cam when said hanger is rotated from a stop by said wand;
> and first biasing means continuously urging said hanger back toward said stop.

7. The combination of claim 5 wherein:
> said brush holder has a first arm outboard of said brush, the outermost point on said arm being disposed in a first vertical plane parallel to the direction of said path;
> said wand having a distal end just inboard said plane and nearer said approaching vehicle than is said brush.

8. The combination of claim 7 wherein said second sensor means include:
> a second hanger, said second hanger being disposed outboard said plane and spaced from said arm;
> and a second wand mounted to said second hanger and projecting therefrom toward said brush for engagement by said vehicle second portion during passage thereof by said brush;
> said second hanger being pivotally mounted to said holder for pivoting relative thereto upon engagement of said second wand by said vehicle second portion to thereby actuate said second sensor means.

9. The combination of claim 5 wherein said first motor means includes:
> a first hydraulic cylinder secured to said overhead structure;
> a second hydraulic cylinder secured to said carriage;
> a first piston rod axially movable and normally retracted in said first cylinder;
> a second piston rod axially movable in said second cylinder and normally extending therefrom;
> said cylinders and rods having colinear axes parallel to said guide means, and said first and second rods being affixed together external to said cylinders;
> said brush being normally disposed by said first motor means near the center of said path and movable from the center toward one side of said path by extension of said first rod from said first cylinder, and movable from the center toward the other side of said path by retraction of said second rod into said second cylinder.

10. The combination of claim 9 wherein:
> said carriage includes a member extending transverse to the line of said axes and having an aperture therethrough;
> a support bar is affixed to said second cylinder and extends through said aperture;
> a first spring is sandwiched between said second cylinder and said transverse member and a second spring is sandwiched between said member and a washer retained on said bar by a nut received on said bar;
> whereby said second cylinder is secured to said carriage resiliently for shock avoidance.

11. In a vehicle cleaning apparatus, the combination comprising:
> mount means;
> a cleaning member supported on said mount means in a first position wherein said cleaning member is engageable with first and second portions of a vehicle to be cleaned;
> first sensor means disposed between said cleaning member and said vehicle second portion;
> first motor means coupled to said cleaning member;
> and control means coupled to said motor means and to said first sensor means and responsive to actuation of said sensor means by said vehicle second portion to cause said motor means to move said cleaning member away from said first position to avoid said vehicle second portion;
> said cleaning member extending across the path of the vehicle to be cleaned, said first sensor means being disposed to one side of the center of said path, the combination further comprising:
>> additional sensor means disposed to the other side of the center of said path and substantially aligned transversely with said first sensor means;
>> said control means being coupled to said additional sensor means and responsive to actuation of said additional sensor means to cause said motor means to move said cleaning member away from said first position in a sense opposite movement thereof in response to actuation of said first sensor means.

12. The combination of claim 1 wherein said control means include:
> a closed-center, spring-centered, three-position, pneumatically-operated directional valve having a hydraulic supply inlet and a return outlet and first and second pilots;
> a first air switch operable upon actuation of said first sensor means to apply air to said first pilot to move said directional valve to a second position directing hydraulic fluid from said inlet in one line to said motor means to cause said motor means to move said cleaning member away from said first position;
> and a second air switch operable in response to actuation of said second sensor means to apply air to said second pilot to move said directional valve to a third position directing hydraulic fluid from said inlet in another line to said motor means to cause said motor means to return said cleaning member to said first position.

13. The combination of claim 12 and further comprising an accumulator coupled to said second pilot to delay movement of said valve to said third position for a predetermined time after actuation of said second sensor means, and a restriction in the vent path of said second pilot to hold said valve in said third position for a predetermined time.

References Cited

UNITED STATES PATENTS 3,035,293    5/1962    Larson.
3,251,084    5/1966    Larson et al.

EDWARD L. ROBERTS, Primary Examiner

U.S. Cl. X.R.

15—53